United States Patent [19]

Kritz et al.

[11] 3,761,880

[45] Sept. 25, 1973

[54] VARIABLE SPEED PRINTER

[75] Inventors: Albert M. Kritz, Monsey; Maurice J. Epstein, Ardsley, both of N.Y.

[73] Assignee: Computer Transceiver Systems, Inc., Paramus, N.J.

[22] Filed: Mar. 3, 1972

[21] Appl. No.: 231,638

[52] U.S. Cl. .................................... 340/172.5

[51] Int. Cl. .................................... G06k 15/10

[58] Field of Search .................... 340/172.5; 197/48, 197/55, 1 R

[56] References Cited

UNITED STATES PATENTS

| | | | |
|---|---|---|---|
| 3,670,861 | 6/1972 | Zenney et al. | 197/1 R X |
| 3,353,648 | 11/1967 | Amada et al. | 197/55 |
| 3,493,091 | 2/1970 | Kapp | 197/55 X |
| 3,366,214 | 1/1968 | Tutert et al. | 197/48 |
| 3,668,652 | 6/1972 | Zahn | 340/172.5 |
| 3,561,581 | 2/1971 | Takenaka | 197/49 |
| 3,470,539 | 9/1969 | Proud, Jr. et al. | 340/172.5 |

*Primary Examiner*—Paul J. Henon
*Assistant Examiner*—Paul R. Woods
*Attorney*—Frederick E. Hane et al.

[57] ABSTRACT

A variable speed printer has a printing head driven opposite a record medium which is controllably energized to print graphics (symbols, characters and/or numerics) sequentially transmitted from a multicharacter buffer storage which sequentially receives representations of the characters. The print head is driven at a speed related to the number of characters stored in the buffer storage and is energized to print the character then being transmitted from the buffer storage whenever one of a plurality of particular instantaneous positions of the print head is sensed by a sensing means which also initiates the making available of the next character in the buffer storage for transmission.

10 Claims, 4 Drawing Figures

PRINTER 10

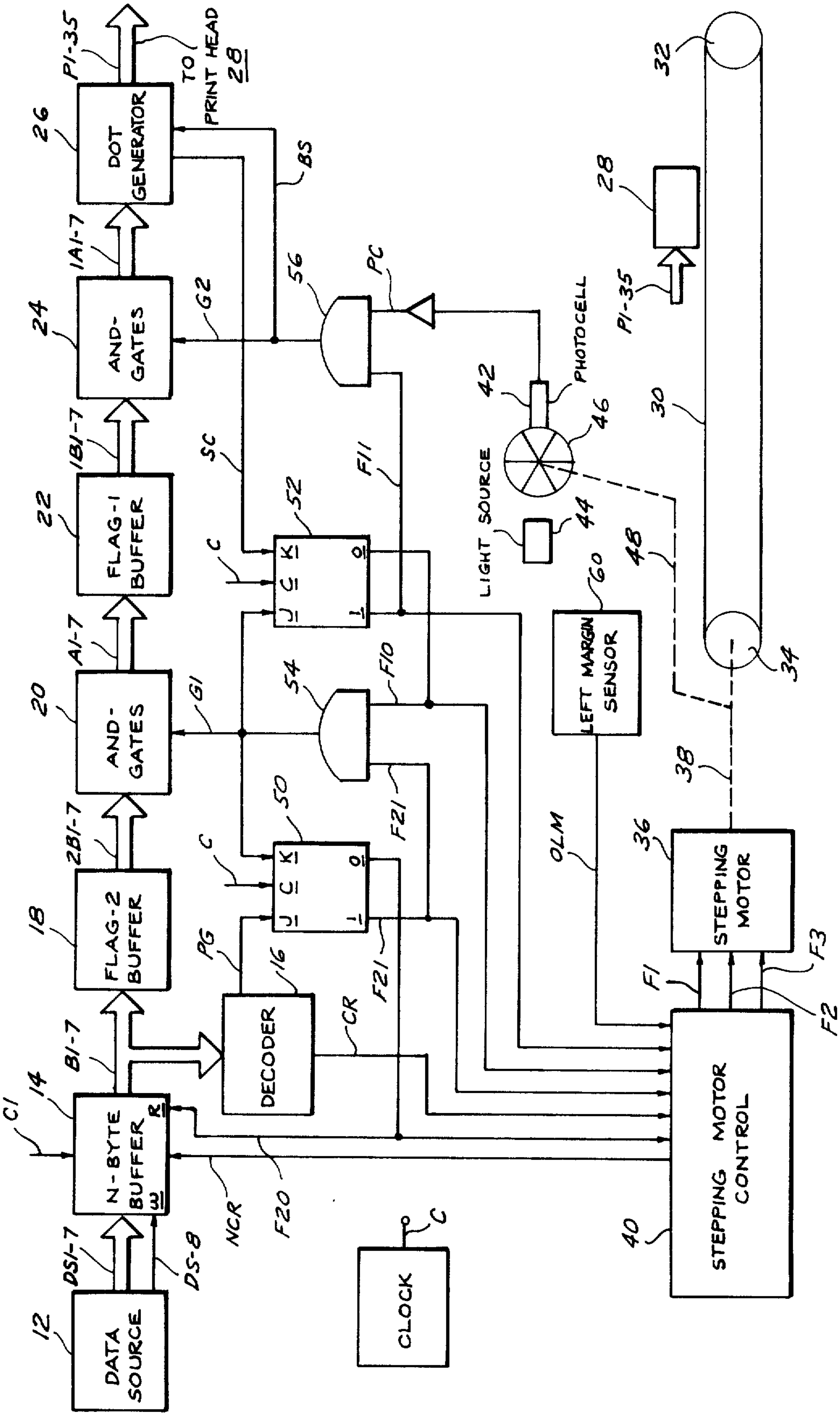
FIG. 1 PRINTER 10

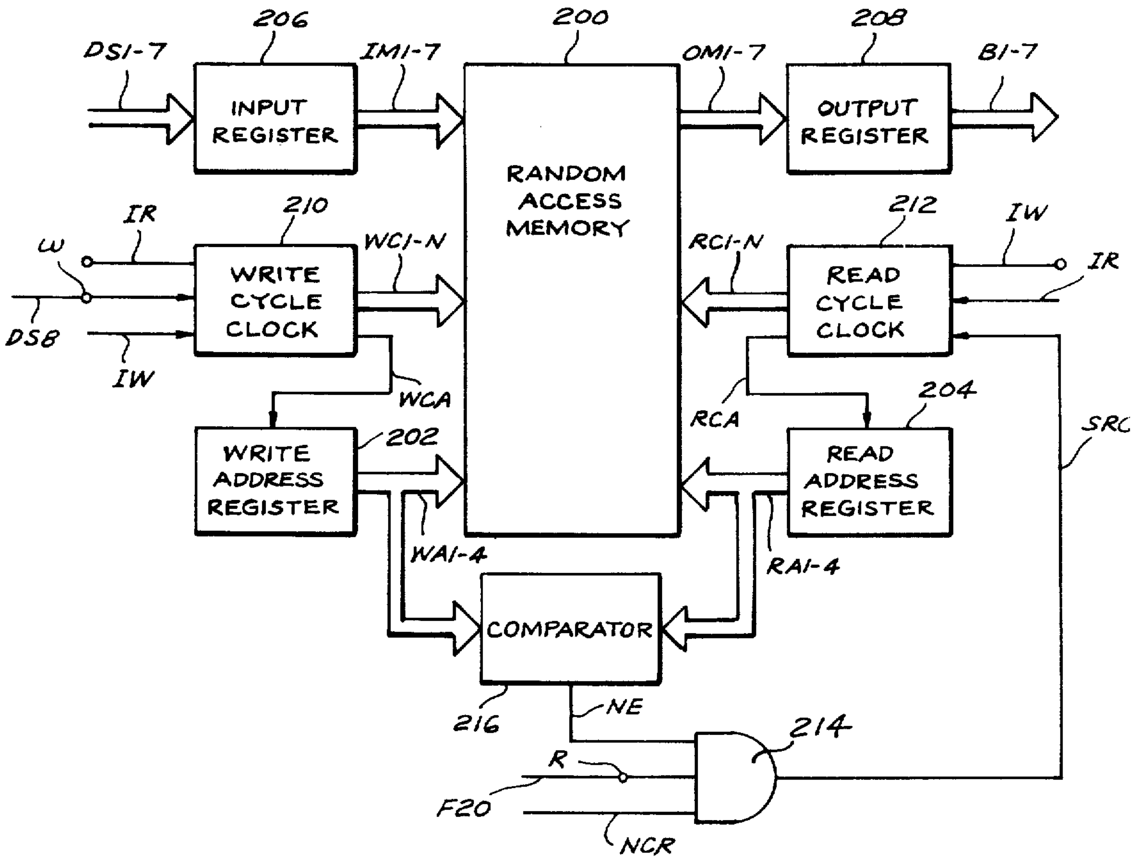
FIG. 2 N-BYTE BUFFER 18
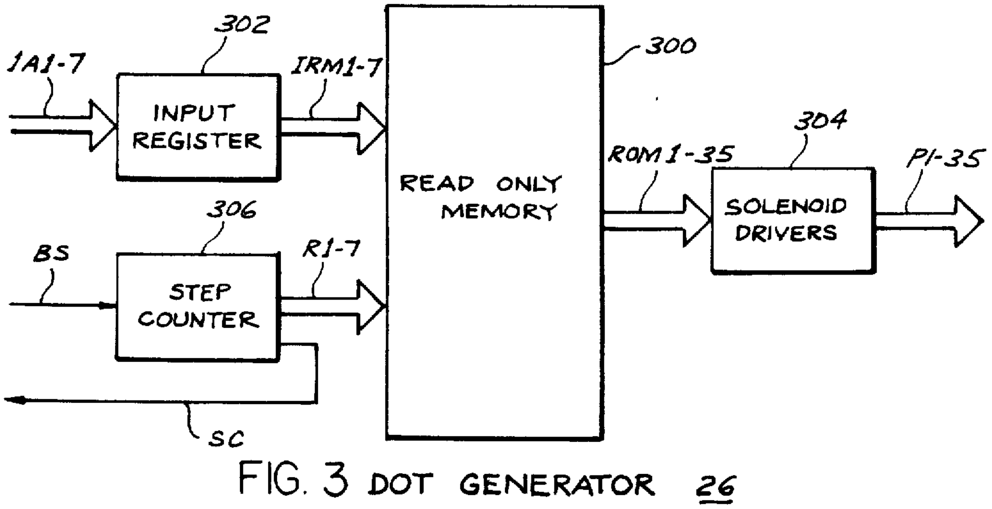
FIG. 3 DOT GENERATOR 26

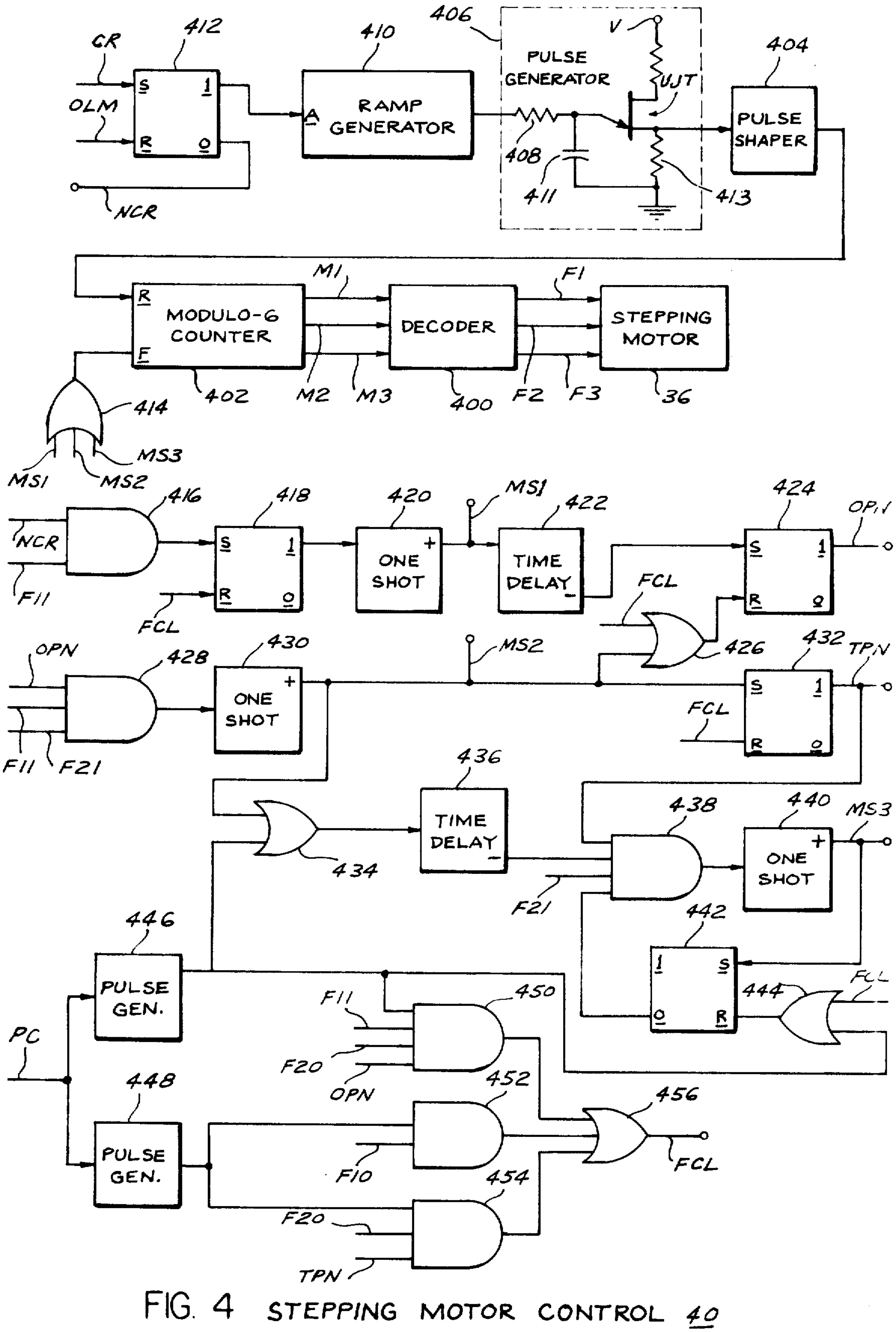
FIG. 4 STEPPING MOTOR CONTROL 40

VARIABLE SPEED PRINTER

This invention pertains to variable speed printers and more particularly, to such printers which asynchronously print graphics in response to sequentially received signal representations of the graphics.

Sequential printers are used in many data communications systems. In a typical system the printer is incorporated in a peripheral terminal which is connected to a computer. Signal representations of the graphics to be printed are sequentially transmitted from the computer to the peripheral terminal. As each signal representation is received, a print head is energized to print the associated graphic and then the print head carrier is indexed one print position to the right. Thus, one graphic print cycle includes a printing step and an indexing step. In order to maintain uniform spacing between the graphics printed on the record medium, the indexing is advantageously performed by energizing a stepping motor which is mechanically connected to the print head carrier. The use of stepping motors implies a step-by-step operation with the inherent acceleration problems introduced by the inertia of the motor and the mechancial linkages and the print head. Consequently, printing speed is limited by the size of the stepping motor.

Printing speeds can be increased if the graphics are printed at a constant fixed rate. However, this approach is not practical because within the data stream to the printer are representations which control other operations of the printer such as "carrier" (carriage) returns and backspacing which interrupt the smooth flow of the printing of graphics. If the printer were operating at the fixed rate, the accelerations occurring because of backspacing and carrier returns would destroy the uniform spacing between the printed graphics.

It is, accordingly, a general object of the invention to provide an improved printer of sequentially received signal representations of graphics.

It is another object of the invention to provide such a printer which prints at a varying speed wherein the speed is faster than that of presently available printers.

It is another object of the invention to provide such a printer which operates asynchronously at high speed.

Briefly, the invention contemplates apparatus for controlling the times when a print head which is movable opposite a record medium, prints graphics represented by sequentially received coded combinations of signals. The apparatus includes a multistage buffer storage means having an input means for sequentially receiving and storing the coded combinations of signals in different stages and an output means for sequentially transmitting the coded combinations of signals stored in the different stages. First and second indicating means indicate the presence of a coded combination of signals in first and second particular stages, respectively. Drive means index the print head at a speed at least partially determined by the states of each of the indicating means while means activate the print head to print the graphic represented by the coded combination of signals being transmitted when the print head is in any one of a plurality of different positions.

Other objects, features and advantages of the invention will be apparent from the following detailed description when read with the accompanying drawing wherein:

FIG. 1 is a schematic diagram of a printer in accordance with the invention;

FIG. 2 is a block diagram of the N-byte buffer of the system of FIG. 1;

FIG. 3 is a block diagram of the dot generator of the system of FIG. 1; and

FIG. 4 is a block diagram, partially in schematic, of the stepping motor control of FIG. 1.

In the description of the system the following conventions will be employed:

1. Each signal has a reference character equal to the signal designation, i.e., the CR signal line carries the CR signal;

2. Positive logic will be employed. Thus, when a signal is present, it is "high" and equivalent to logical 1 or + while at the same time its inverse is "low" and equivalent to logical 0 or −. When a signal is absent it is low and its inverse high. Signals will be designated by unprimed reference characters while their inverses will be represented by primed reference characters;

3. Throughout the description the terminology "graphic" is used to indicate a character, a numeric or a symbol;

4. Also, throughout the description the terminology "byte" will be used to indicate a coded combination of bits or signals representing a graphic, a function to be performed by the printer, or an operation ("op") code;

5. When the expression such as "a byte is transferred" is used, it should be realized that actually the coded combination of signals or bits forming the byte are transferred.

6. Bytes are transferred serially with the bits of the bytes transferred in parallel over a plurality of lines. For example, bytes are transferred from a data source on seven parallel lines, each carrying one bit of the byte. Instead of showing seven lines, the lines are merged into a cable indicated by a reference character DS1–7 which implies seven lines DS1, DS2, ....,DS7;

7. All flip-flops, counters and registers have been initialized by means not shown.

The printer 10 according to the invention is shown in FIG. 1 receiving the bytes representing the graphics to be printed from data source 12. Although data source 12 can take many forms, it will be assumed to be the receiving portion of a modem connected to a remote source. The data source 12 is assumed to emit each graphic representation as a byte on seven parallel lines DS1–7 and a strobe pulse on line DS8 connected to the inputs of N-byte buffer 14.

Buffer 14, hereinafter more fully described, is a multistage storage means wherein each stage stores one byte of a graphic to be printed or a function to be performed such as a carrier return or an operation code some of which may be ignored. The buffer 14 simulates a first-in, first-out storage with a byte being written-in each time a pulse signal is received at write input W connected to line DS8 from data source 12 and with a byte being read out onto lines B1–7 each time a pulse signal is recieved at read input R connected to line F20. Lines B1–7 are connected to inputs of decoder 16 and flag-2 buffer 18.

Flag-2 buffer 18 is a one byte storage register which can be seven parallel flip-flops or latches having the property of changing their contents each time a new byte is received at their inputs respectively connected to lines B1–7. The seven parallel outputs of buffer 18 are connected to lines 2B1–7, respectively.

Decoder 16 can be a conventional decoding matrix which senses for printable graphics and emits a pulse signal on line PG whenever the byte being transferred to buffer 18 represents a graphic which is to be printed. It also senses for the byte representing a carrier return, in which case, it emits a signal on line CR. It can also include means to sense for function bytes representing backspace, line feed, vertical tab, etc., but to simplify the teaching such functions will not be discussed.

Each of the lines 2B1–7 is connected to one input, respectively, of a different one of seven two-input AND-gates 20 whose second inputs are connected to a line G1. The outputs of each of the AND-gates 20 is connected via one of the lines A1–7, respectively, to an input of flag-1 buffer 22 whose outputs are connected to lines 1B1–7. Flag-1 buffer 22 can be similar to flag-2 buffer 18 or buffer 22 can be seven latches each having an input control to accept a bit in response to a gating signal. In such case, the AND-gates 20 can be deleted and the outputs of buffer 18 connected to the inputs of buffer 22 with line G1 connected to the gating signal input.

In any event, the outputs of buffer 22 are connected to AND-gates 24, similar to AND-gates 20, but having their second inputs connected to line G2 and their outputs connected, via lines 1A1–7, to dot generator 26.

Dot generator 26, hereinafter more fully described, converts the graphic byte into a plurality of signals on lines P1–35 which energize the print head 28. The conversion is initiated in response to a signal on line BS and dot generator 26 indicates the termination of the conversion by a signal on line SC.

Print head 28 can comprise a 5×7 matrix of print wires each driven by a separate solenoid with each solenoid being under control of a signal on a different one of the lines P1–35. The print head 28 faces an inked ribbon, a paper record medium and a platen (not shown) in such a manner that when any solenoid is energized its associated wire causes the printing of a dot on the paper. Thus, it is apparent that by energizing appropriate solenoids, arrays of dots representing graphics can be printed.

Print head 28 is carried on a toothed belt 30 supported by idler gear 32 and drive gear 34. The belt and gear assemblage is so disposed with respect to the paper record medium and platen so that the head can be transversely indexed along a line of the paper. This transverse indexing is accomplished by a stepping motor 36 whose shaft is connected to gear 34 as indicated by dotted line 38. The operation of stepping motor 36 is controlled by signals on lines F1, F2 and F3 from stepping motor control 40, hereinafter more fully described.

In order to insure good registration of the printed graphics, allowable print positions of print head 28 are indicated by signals on line PC which effectively control when the dot generator is energized. These signals are generated by photocell 42 in response to light from source 44. Interposed in the optical path between source 44 and photocell 42 is a slotted disc 46 which is also coupled to the shaft of stepping motor 36 by a means indicated by dashed line 48. The slots of disc 46 are equispaced and the distance between the slots define the number of characters per inch. Because of these facts and because of the coupling between stepping motor 36, drive gear 34 and disc 46, the spacing between printed graphics is uniform and fixedly maintained when one realizes that the PC signals control the time of printing.

The printer 10 also includes output control circuitry which controls the shifting of the bytes from buffer 14, through buffer 18, AND-gates 20, buffer 22 and AND-gates 24 to dot generator 26. This circuitry includes JK-flip-flops 50 and 52 and AND-gates 54 and 56. In addition, the JK-flip-flops 50 and 52 effectively indicate whether the buffers 18 and 22, respectively, are storing bytes and transmit signals via lines F21, F20, F11 and F10 representing these conditions to stepping motor control 40 for controlling the stepping speed of stepping motor 36.

The operation of the printer 10 will now be described. As each byte is transmitted from data source 12 it is loaded into a different stage of N-byte buffer 14 via lines DS1–7 under control of signals on line DS8. Buffer 14 has sufficient stages so that it can store as many bytes presented to it before any bytes are extracted when the print head is not ready to print a graphic. The worst case is when the print head is at the right margin and is directed to return to the left margin as is hereinafter described. For the time being, assume such is not the case as indicated by the transmission of the NCR (no carrier return) signal from stepping motor control 40 to buffer 14 and further assume only one graphic byte is loaded into buffer 14 and flip-flops 50 and 52 have been initially reset. Because of the presence of the byte in a stage of buffer 14 and the reset condition of flip-flop 50 which is indicated by a signal on line F20 a read cycle is initiated in buffer 14. The read-out byte is transmitted via lines B1–7 to flag-2 buffer 18 and to decoder 16. If the read-out byte represents an operation code for which there is not printer action decoder 16 ignores it and another read cycle will be generated. If the read-out byte is a carrier return function byte decoder 16 transmits a CR signal to stepping motor control 40 which drives stepping motor 36 in the reverse direction to index the print head 28 to the left margin. Such stepping continues until the print head reaches the left margin as indicated by the transmission of an OLM signal from left margin sensor 60 to stepping motor control 40. Left margin sensor 60 can be a microswitch, photocell or the like which senses when the print head reaches a certain position related to the left margin. Upon receipt of the CR signal motor control 40 stops transmitting the NCR signal to buffer 14 and only begins retransmitting the signal upon receipt of the OLM signal. During the absence of the NCR signal buffer 14 is inhibited from generating any read cycles.

If the read-out byte is a graphic byte, decoder 16 transmits a PG signal to flip-flop 50 which is then set, terminating the signal on line F20 and initiating the signal on line F21. Note, when flip-flop 50 is set, it indicates by the signal on line F21 that a graphic or printable byte is loaded in flag-2 buffer 18. Also, note that the absence of a signal on line F20 prevents the generation of read cycles in buffer 14.

Since flip-flop 52 is reset by virtue of an initial clear (not shown) there is a signal on line F10 and no signal on line F11. The coincidence of signals on lines F21 and F10 causes AND-gate 54 to transmit a signal on line G1 which (1) opens AND-gates 20 transferring the byte in buffer 18 to buffer 22; (2) resets flip-flop 50 terminating the signal on line F21 and initiating the signal on line F20; and (3) sets the flip-flop 52 terminating the signal on line F10 and initiating the signal on line F11. The setting of flip-flop 52 indicates a graphic byte is stored in flag-1 buffer 22. When the signal reappears on line F20 another read cycle can be initiated in buffer 14. However, it was assumed that only one byte was loaded into buffer 14. Therefore, no read cycle is initiated. At the same time the signal on line F11 is received (1) at motor control 40 to initiate the stepping by one step of motor 36; and (2) at AND-gate 56.

Motor 36 starts its step rotating gear 34 to index print head 28 one space to the right and to rotate slotted disc 46. Upon the passage of light through a slot in the disc a PC signal passes through AND-gate 56 onto lines G2 and BS. The signal on line G2 opens AND-gates 24 and the byte in buffer 22 enters dot generator 26. The signal on line BS activates dot generator 26 to convert the byte to a combination of signals on lines P1-35 which activate the appropriate solenoids of print head 28 to print the graphic. At the end of the conversion, dot generator 26 generates an SC signal which resets flip-flop 52 terminating the F11 signal and regenerating the F10 signal. Nothing further happens until another byte is loaded into buffer 14. Although it was assumed only one byte was loaded into buffer 14, it should be realized that the same operating cycle would occur for the sequential loading of bytes into buffer 14 if the loading rate were slower than the rate for performing single steps by stepping motor 36.

Now assume that at least two bytes had been in buffer 14. Then after the generation of the signal on line G1 which transferred the contents of buffer 18 to buffer 22, and which set flip-flop 52 to initiate the stepping of motor 36 and which reset flip-flop 50, another read cycle is generated in buffer 14. The byte read-out is sampled by decoder 16 and also loaded into buffer 18. Because the byte transfer speed through the system is much faster than the speed of operation of motor 36, buffers 18 and 22 each store a byte. If the byte just shifted into buffer 18 is a graphic byte, decoder 16 generates a PG signal which again sets flip-flop 50 terminating the signal on line F20 to prevent another read cycle and initiating a signal on line F21. Since buffer 22 is holding a byte as indicated by flip-flop 52 being set with the signal on line F10 absent, AND-gate 54 is inhibited causing AND-gates 20 to be blocked. Thus, the byte transfer from buffer 18 to buffer 22 is stalled. However, the signal on line F21 is also fed to stepping motor control 40. Remember, stepping motor 36 has been commanded to step in response to the signal on line F11. Now, if the signal on line F21 occurs within a given period of time after the signal on line F11, stepping motor 36 is commanded to step again and the net effect is to increase the stepping speed. When the first occurring slot in disc 46 is sensed, the graphic represented by the byte in buffer 22 is printed as described above. However, note that the motor 36 had been commanded to perform another step. Also, recall that at the end of the conversion, dot generator 26 transmits an SC signal to reset flip-flop 52 terminating the F11 signal but more importantly regenerating the F10 signal. Consequently, AND-gate 54 generates another G1 signal for transferring the contents of buffer 18 to buffer 22, for resetting flip-flop 50 and for again setting flip-fop 52. At this time, flag-1 buffer 22 contains the next byte to be printed, flag-2 buffer 18 is "empty" and another byte is called from buffer 14. If a graphic byte is available it is loaded into buffer 18 in the usual manner and flip-flop 50 is again set. The simultaneous presence of the F21 and F11 signals at motor control 40 cause it to command another step of motor 36 which further speeds up the indexing of print head 28. Again, the byte in buffer 22 is printed on the sensing of the next slot in disc 46. The operation continues as long as there are bytes available in buffer 14. However, the acceleration of the stepping of motor 36 stops after a maximum speed is reached by virtue of a governor circuit in motor control 40 as is hereinafter described.

When data source 12 stops transmitting bytes, buffer 14 is unloaded and when the final byte is transmitted from buffer 14, the situation is equivalent to the above-described operation when only one byte was in buffer 14 and the processing proceeds in the same manner except there is no single step command because of the presence of only the F11 signal since the previous simultaneous presence of the F21 and F11 signals initiated the last step command.

N-byte buffer 18 shown in FIG. 2 centers around random access memory 200 which can be, by way of example, a sixteen addressable flip-flop register with a self-contained address decoder. Each of the flip-flop registers has the capacity to store one byte. A write address register 202 is connected via lines WA1-4 to the address decoders during a write cycle and a read address register 204 is connected via lines RA1-4 to the address decoders during a read cycle. One-byte input register 206 receives bytes from data source 12, via lines DS1-7, and stores each byte until a read cycle is generated when the byte is transferred, via lines IM1-7, to the byte register of memory 200 whose address is then indicated by the contents of write address register 202. During a read cycle the contents of the byte register of memory 200 whose address is then indicated by the contents of read address register 204 are transferred, via lines OM1-7, to one-byte output register 208.

A write cycle clock 210 and read cycle clock 212 generate the sequences of pulses required to perform the write and read cycles, respectively. These pulses are fed via lines WC1-N and RC1-N, respectively, to memory 200. Write cycles are generally initiated by signals received at terminal W connected via line DS8 to data source 12. Read cycles are initiated by signals on line SRC connected to the output of three-input AND-gate 214. One input of the gate is connected to terminal R which receives signals on line F20 from flag-2 buffer 18 (FIG. 1), a second input is connected, via line NCR, to stepping motor control 40 (FIG. 1), and the third input is connected, via line NE, to the output of equality comparator 216. Equality comparator 216 is a conventional parallel binary comparator which emits a signal whenever the binary values of the numbers received at its inputs are not equal. One input receives the write address, via line WA1-4, from write address register 202, and the other input receives the read address, via line RA1-4, from read address register 204.

In operation, whenever a byte is transmitted by data source 12 (FIG. 1) it enters input register 206. The strobe pulse on line DS8 associated with this byte initiates a write cycle provided a read cycle is not in progress as indicated by a signal on line IW from read cycle clock 212. If a read cycle is in progress the IW signal inhibits the initiation of the write cycle. At the end of the read cycle the IW signal disappears and the write cycle will then start. Assume now that both address registers 202 and 204 have been cleared to zero by an initial clear (not shown). Thus, the byte register with address zero is accessed and the contents of input register 106 are loaded into byte register zero of memory 200. At the end of the write cycle a signal on line WCA unit-increments the count in write address register 202. Note also, that during the entire cycle write cycle clock 210 transmits a signal on line IR to read cycle clock 212 to inhibit the generation of a read cycle.

Each byte from data source 12 is processed in the same way so that the bytes are stored in sequentially addressed byte registers of memory 200. Note, that there are 16 such byte registers. Thus, if write address register 202 is a four stage binary counter it will count modulo-16 so that addresses zero to 15 are sequentially generated for the first 16 bytes that are received and then the cycle repeats, i.e., byte 17 is stored in byte register zero, byte 18 in byte register one, etc.

Now it should be realized that the received bytes are to be transmitted from buffer 18 in the same order they are received. Therefore, read address register 204 is the same as write address register 202 and is initialized to the same zero value. Furthermore, it should be apparent that whenever the values in each address register are different memory 200 is storing at least one byte which should be outputted. In other words, if the addresses are equal there will be no read cycle since there is nothing valid to read. Hence, comparator 216 continuously compares the addresses stored in address registers 202 and 204 and, as long as they are not equal, transmits a signal on line NE. Furthermore, if the print head is not performing a carrier return function there is a signal on line NCR. Therefore, if both of these signals are present the state of AND-gate 214 is determined by the state of line F20. (This is the usual case.) It will be recalled that a signal will be present on line F20 whenever flag-2 buffer 18 is empty. At that time, a signal will be transmitted on line SRC to initiate a read cycle provided a write cycle is not in progress as indicated by the presence at read cycle clock 212 of a signal on line IR from write cycle clock 210. If the IR signal is present, the read cycle is stalled until the termination of the IR signal at the end of the write cycle. During the read cycle the contents of the byte register whose address is indicated by the contents of read address register 204 is transferred from memory 200, via lines OM1–7, to output register 208. At the end of the read cycle a signal on line RCA from read cycle clock 212 unit-increments the count in read address register 204. Note that during the entire read cycle, read cycle clock 212 generates the IW signal which is fed to write cycle clock 210 to prevent any write cycles. All subsequent byte transmissions from N-byte memory 200 are performed in the same manner. Now it should be noted that during a carrier return function of the print head there are several write cycles without any intervening read cycles. However, since the upper limit of the print rate is designed to be faster than the fastest specified input rate from data source 12 and since memory 200 can store at any one time sixteen bytes and since the time to perform a carrier return function is less than the time to receive, say, 10 bytes, there is no chance of saturating buffer 18. In fact, buffer 18 acts as an elastic storage which accumulates bytes during start ups and carrier return and other time-consuming functions and starts working off this accumulation once actual high speed printing commences until the buffer is empty. At that time, the speed of printing slows down to follow the input data rate.

Dot generator 26, as shown in FIG. 3, centers around read only memory 300. Read only memory 300 is basically a translator which converts the seven bits representing a graphic byte into a combination of 35 bits that are so ordered that they represent the dots of a five column-by-seven row matrix which are used to form the graphic.

The graphic byte receive on lines 1A1–7 is loaded into seven-bit input register 302 whose outputs are connected, via lines IRM1–7, to read only memory 300, the bits read from read only memory 300 are fed in parallel over lines ROM1–35 to 35 solenoid drivers 304 whose outputs are connected in parallel, via lines P1–35, to their associated solenoids of print head 28 (FIG. 1).

In order to simplify the power and circuitry requirements of the memory 300 step counter 306 permits the scanning of the bits a row at a time. Thus, when step counter 306 is triggered by a pulse on line BS from AND-gate 56 (FIG. 1) to start the printing of a graphic, it emits eight sequentially occurring pulses. Each of the first seven pulses, associated with a different row of the dot matrix, is transmitted to read only memory 300, via one of the lines R1–7. The eighth pulse is transmitted, via line SC (scan complete), to flip-flop 52 (FIG. 1) to essentially indicate that the graphic has been printed.

In operation, the graphic byte enters input register 302 and is presented to read only memory 300. Then the step counter 306 performs its scan and the selected solenoid drivers 304 are activated. The operation ends with the generation of eighth pulse signal on line SC.

Stepping motor control 40, as shown in FIG. 4, functions to step the stepping motor 36 in a forward or a reverse direction. Stepping motor 36 is of the type that has six discrete positions and is sequentially driven from position to position by polarities of voltages on pairs of lines F1, F2 and F3 from decoder 400. Decoder 400 receives, at any one time, one of six unique binary coded combinations of signals on lines M1, M2 and M3 from modulo-6 counter 402 and generates a combination of positive and negative voltages on a pair of the lines F1, F2 and F3. Modulo-6 counter 402 can be an up-down counter which counts in an up direction (increments) pulses received at its F(forward) input and counts in a down direction (decrements) pulses received at its R (reverse) input. Counter 402, decoder 400 and stepping motor 36 are so interconnected and stepping motor 36 is so connected to drive gear 34 (FIG. 1) that each pulse received at input F of counter 402 causes print head 28 (FIG. 1) to index one position to the right and each pulse received at input R of counter 402 causes print head 28 to backspace one position to the left.

The generation of the reverse pulses is performed by pulse shaper 404 driven by pulse generator 406. Pulse generator 406 is a conventional unijunction transistor relaxation oscillator except that timing resistor 408 is connected to a variable voltage source in the form of ramp generator 410. If the input voltage to resistor 408 is sufficiently low the transistor UJT remains biased to cut off and no pulses are generated. If the input voltage is raised enough so that the emitter electrode as a result of the accumulation of charge on capacitor 411, obtains a voltage sufficient to cause conduction, the accumulated charge on capacitor 411 rapidly discharges through the transistor UJT and resistor 413 to emit a pulse to pulse shaper 404. Then capacitor 411 starts recharging and the cycle is repeated. Now, the pulse repetition rate is a function of not only the time constant of capacitor 411 and resistor 408 but also the magnitude of the input voltage to resistor 408. In fact, the higher the input voltage, the faster the pulse repetition rate. Hence, by varying the magnitude of the input voltage one can vary the pulse repetition rate.

Ramp generator 410 when activated, generates a variable output voltage which starts from a value which maintains pulse generator 406 inactive and monotonically increases to an upper limit value where it remains until ramp generator 410 is deactivated. Thus, under the control of ramp generator 410 the pulse rate starts off slowly and speeds up to a high constant value. Ramp generator 410 is a conventional device which is activated during presence of a signal at its activating input A.

Input A is connected to the "1" or set output of flip-flop 412 whose set input S is connected to line CR and whose reset input R is connected to line OLM. The "0" or reset input of the flip-flop 412 is connected to line NCR. Flip-flop 412 is set when a carrier return is called for as indicated by the presence of a signal on line CR from decoder 16 (FIG. 1) and is reset when the carrier reaches the left-hand margin as indicated by the signal on OLM from left-hand margin sensor 60 (FIG. 1).

In operation, when the CR signal sets flip-flop 412, ramp generator 410 is activated causing pulse generator 406 to generate pulses which are fed via pulse shaper 404 to the reverse input R of counter 402 causing stepping motor 36 to step backward to drive the print head 28 (FIG. 1) toward the left margin. When the print head is sensed at the left margin by sensor 60 (FIG. 1) it generates the OLM signal which resets flip-flop 412. Note, that while the flip-flop is set there is no signal on line NCR which indicates to buffer 14 (FIG. 1) that a carrier return is in progress and no read cycles can be performed.

Now because of the increasing rate of pulse generation up to a constant upper rate stepping motor 36 gradually accelerates the print head up to a high speed. In this way a minimum return time of the print head to the left margin is obtained without using a prohibitively large motor or placing undue stresses on the mechanical components.

Forward indexing of the motor 36 is controlled by pulses received at forward input F of counter 402 from OR-circuit 414 whose inputs are connected to lines MS1, MS2, and MS3.

Line MS1 carries a pulse only when the first graphic is printed. This includes the case where the graphic bytes are received at a rate slower than a given rate. Line MS2 carries a pulse to step the motor only for the second sequential graphic to be printed. Line MS3 carries pulses for all subsequent graphics in a string.

When the first graphic byte is in buffer 22 (FIG. 1) as indicated by the signal on line F11 and no carrier return is in progress, as indicated by the presence of the NCR signal, AND-gate 416 whose inputs are connected to lines F11 and NCR transmits a signal from its output to the set input S of flip-flop 418. The "1" output of flip-flop 418 is connected to one-shot 420. One-shot 420 can be a monostable multivibrator which emits a positive going pulse of given time duration in response to the leading edge of a positive going step voltage or pulse received at its triggering input. Thus, when flip-flop 418 is set one-shot 420 emits a pulse on line MS1 and will not emit any more pulses until flip-flop 418 is reset and thereafter set.

The pulse on line MS1 in addition to unit incrementing modulo-6 counter 402 triggers time delay 422 since line MS1 is connected to the triggering input thereof. Time delay 422 can be a one-shot multivibrator which emits a negative going pulse of, say, 8 milliseconds duration when triggered. This time delay is chosen to be close to but less than the maximum rate at which the stepping motor will respond to stepping signals. The trailing edge of the negative going pulse sets flip-flop 424 which starts transmitting the OPN signal from its "1" output since the set input S thereof is connected to the output of time delay 422. Now, if there is also a graphic byte stored in buffer 18 (FIG. 1) as indicated by the signal on line F21, the coincidence of the F11, F21 and OPN signals at inputs of AND-gate 428 causes the output thereof to transmit a positive going step voltage to the input of one-shot 430. One-shot 430 which is similar to one-shot 420 has its output connected to line MS2. The pulse on line MS2 unit increments counter 402 and motor 36 is again urged to step. Note, up to this time motor 36 has been urged to step twice. In response to the first time it started moving while in response to the second time it accelerates even faster than normal. However, as yet, the print head has not reached the first print position which by virtue of the mechanics of the particular system would occur sometime after the eight milliseconds but sometime before 15 milliseconds. The MS2 pulse also passed, via OR-circuit 426, to the reset input R of flip-flop 424 to terminate the OPN signal blocking AND-gate 428. Thus, line MS2 will carry only one stepping pulse. Line MS2 is also connected to the set input of flip-flop 432 whose "1" output is connected to line TPN. Hence, the MS2 pulse will set flip-flop 432 causing the TPN signal to be present at one input of AND-gate 438. Line MS2 is also connected to one input of OR-circuit 434 whose output is connected to the trigger input of time delay 436. Time delay 436 is similar to time delay 422 except that the pulse width is seven milliseconds, a time which is associated with the maximum stepping rate of motor 36. The output of time delay 436 is connected to a second input of AND-gate 438 whose third input is connected to line F21 and whose fourth input is connected to the "0" output of flip-flop 442 which is presently reset. Now, sometime before the end of the seven millisecond time out generated by time delay 436, the first graphic will be printed and the bytes shifted one position through the buffers. If there is a third graphic to be printed it will then be in buffer 18 and the signal on line F21 will be present. At the end of the seven millisecond time out AND-gate 438 triggers one-shot 440 (similar to one-shot 420) to emit a pulse on line MS3. This pulse passes through OR-circuit 414 to cause the next impulse to motor 36 and in addition, upon receipt at the set input S of flip-flop 442, causes the flip-flop to set. With the flip-flop set, its "0" input goes low blocking AND-gate 438. Thus, the further generation of MS3 pulses is stalled until the flip-flop 442 is again reset. This will occur when the printing of a graphic occurs. Note the reset input R of flip-flop 442 is connected to the output of OR-circuit 444 which has an input connected to the output of pulse generator 446. Pulse generator 446 can be a one-shot multivibrator which emits a pulse in re-sponse to a positive going voltage received at its triggering input. Since this input is connected to the PC signal line, the leading edge of PC signal which initiates a print cycle will trigger the pulse generator resulting in the resetting of flip-flop 442. At the same time, however, the pulse from pulse generator 446 passes, via the second input of OR-circuit 434, to time delay 436. Hence, seven milliseconds after the initiation of the print cycle another MS3 pulse is generated to step the motor and set flip-flop 442.

Now the generation of stepping pulses is only dependent on print cycles as long as graphic bytes enter buffer 18. However, it should be noted that the seven millisecond time delay 436 acts as a governor to prevent the generation of stepping pulses at less than seven millisecond intervals so that the maximum speed of reliable operation of the motor 36 is not exceeded. Note also, that the impulses to the motor are ahead of the characters to be printed.

Now when buffer 18 becomes empty because of no more available characters the F21 signal is absent at AND-gate 438 preventing the generation of any more MS3 pulses. However, the F20 signal is present at one input of AND-gate 454 while the TPN signal is present at another input thereof. The third input of the AND-gate is connected to the output of pulse generator 448 which is a one-shot multivibrator which emits a pulse in response to a negative going voltage at its trigger input connected to line PC. Thus, the trailing edge of the next print cycle pulse causes AND-gate 454 to pass a pulse, vial OR-circuit 456, to line FCL to clear the motor control to its initial state. The FCL signal resets flip-flops 418, 424, and 442.

If only two graphics were to be printed then AND-gate 452 which is connected to line F10 and pulse generator 448, would generate the FCL signal while if one graphic was to be printed AND-gate 450 which receives the OPN, F20 and F11 signals as well as the signal from pulse generator 446.

Thus if only one graphic is to be printed or the period between input graphic bytes is very slow, the stepping motor moves in discrete conventional steps. However, as the byte input speeds up or there is a backlog of graphic bytes stored in the buffers counter 402 increments at a rate approaching seven milliseconds between impulses causing stepping motor 36 to speed up to a continuous motion with a speed that oscillates around a given value in accordance with the rate at which graphic bytes are extracted from the buffers.

What is claimed is:

1. In a printing device wherein serially received bytes represent graphics to be printed by a print head which is movable opposite a record medium, apparatus for controlling the rate at which the graphics are printed by the print head comprising a multistage buffer storage means, said storage means having an input means for sequentially receiving and storing the bytes in different stages and output means for sequentially transmitting the bytes stored in the different stages in the order in which the bytes were received, drive means connected to said storage means for moving said print head opposite the record medium at a rate of speed at least partially determined by the number of bytes stored in said storage means, and activating means for activating said print head to print the graphic represented by the byte being transmitted when the print head is moving past any one of a plurality of different positions along a transverse line of the record medium.

2. The apparatus of claim 1 wherein said drive means includes first indicating means for giving an indication when a byte is stored in a first particular stage of said buffer storage means, second indicating means for giving an indication when a byte is stored in a second particular stage of said buffer storage means, stepping motor means, means connecting said stepping motor means to said print head for moving said print head in synchronism with the stepping of said stepping motor means, and impulse generating means for transmitting stepping impulses to said stepping motor means at a rate which is a function of the indications being given.

3. The apparatus of claim 2 wherein said impulse generating means includes first means for transmitting only one stepping impulse when an indication is only given by said first indicating means.

4. The apparatus of claim 3 wherein said impulse generating means further includes second means for transmitting a stepping impulse a given time after said one stepping impulse regardless of whether or not the graphic associated with the indication given by said first indicating means has been printed the first time indications are given by both said first and second indicating means.

5. The apparatus of claim 4 wherein said impulse generating means further includes third means operative after the operation of said first and second means for transmitting a stepping impulse each time said second indicating means gives an indication and a graphic is printed.

6. The apparatus of claim 5 further comprising means for governing the rate at which said third means transmits stepping impulses to below a given upper limit.

7. The apparatus of claim 1 further comprising means for governing the rate of speed at which said print head is moved to below a given upper limit irrespective of the number of bytes stored in said storage means.

8. In a printing device wherein graphics are printed by a print head which is rectilinearly movable opposite a record medium, apparatus for controlling the return of the print head from one position opposite the record medium to a home position opposite the record medium comprising a stepping motor means which steps in response to impulses, means connecting said stepping motor means to said print head for moving said print head toward the home position in synchronism with the stepping of said stepping motor means, impulse generating means for generating impulses at a rate which monotonically increases to a given upper limit, means for activating said impulse generating means, and means for sensing the arrival of the print head at the home position to deactivate said impulse generating means.

9. The apparatus of claim 8 wherein said impulse generator comprises a voltage controlled pulse generator which generates impulses whose frequency is related to the amplitude of a control voltage, a switchable ramp voltage generator means for generating a ramp voltage which monotonically increases in amplitude from a first value to a second value, and means for switching on and off said ramp voltage generator means in response to the operation of said activating means and said sensing means, respectively.

10. The apparatus of claim 9 wherein said voltage controlled pulse generator comprises a unijunction transistor, means for applying operating voltages to said unijunction transistor, a resistor-capacitor series circuit, the junction of said resistor and capacitor being connected to the emitter electrode of said unijunction transistor, and means for applying the ramp voltage across said series circuit.

* * * * *